(12) United States Patent
Gronauer

(10) Patent No.: US 11,175,168 B2
(45) Date of Patent: Nov. 16, 2021

(54) METER WITH METER HOUSING AND COVER

(71) Applicant: DIEHL METERING GMBH, Ansbach (DE)

(72) Inventor: Christoph Gronauer, Pyrbaum (DE)

(73) Assignee: Diehl Metering GmbH, Ansbach (DE)

( * ) Notice: Subject to any disclaimer, the term of this patent is extended or adjusted under 35 U.S.C. 154(b) by 0 days.

(21) Appl. No.: 16/859,369

(22) Filed: Apr. 27, 2020

(65) Prior Publication Data

US 2020/0256716 A1 Aug. 13, 2020

Related U.S. Application Data

(63) Continuation of application No. PCT/EP2018/000483, filed on Oct. 23, 2018.

(30) Foreign Application Priority Data

Oct. 25, 2017 (DE) .......................... 102017009931.6

(51) Int. Cl.
*G01F 15/14* (2006.01)
*G01F 15/06* (2006.01)

(52) U.S. Cl.
CPC .............. *G01F 15/14* (2013.01); *G01F 15/06* (2013.01)

(58) Field of Classification Search
None
See application file for complete search history.

(56) References Cited

U.S. PATENT DOCUMENTS

| 3,308,664 | A | 3/1967 | Kullmann |
| 4,734,103 | A | 3/1988 | Fong et al. |
| 5,080,744 | A | 1/1992 | McWilliams et al. |
| 5,734,103 | A | 3/1998 | Walding, Jr. et al. |
| 2005/0230040 | A1 | 10/2005 | Walding, Jr. et al. |
| 2016/0187157 | A1 | 6/2016 | Azulay et al. |
| 2016/0265957 | A1 | 9/2016 | Seehoffer et al. |

FOREIGN PATENT DOCUMENTS

| AT | 177563 B1 | 2/1954 |
| DE | 2305743 A1 | 8/1974 |
| DE | 2337465 A1 | 2/1975 |
| DE | 69028438 T2 | 4/1997 |
| EP | 2336732 A1 | 6/2011 |

*Primary Examiner* — Lisa M Caputo
*Assistant Examiner* — Nigel H Plumb
(74) *Attorney, Agent, or Firm* — Laurence A. Greenberg; Werner H. Stemer; Ralph E. Locher

(57) ABSTRACT

A meter has a meter housing with a measurement path through which a fluid which is intended to be measured can flow and an evaluation and display device for establishing at least one fluid-related measurement value. The evaluation and display device is arranged outside on the meter housing. A cover is secured to the meter housing and engages over the evaluation and display device. The cover is a cap of glass which engages over the evaluation and display device and which rests in a state sealed via a sealing agent on the meter housing.

16 Claims, 2 Drawing Sheets

METER WITH METER HOUSING AND COVER

CROSS-REFERENCE TO RELATED APPLICATION

This is a continuation application, under 35 U.S.C. § 120, of copending international application No. PCT/EP2018/000483, filed Oct. 23, 2018, which designated the United States; this application also claims the priority, under 35 U.S.C. § 119, of German patent application No. DE 10 2017 009 931, filed Oct. 25, 2017; the prior applications are herewith incorporated by reference in their entireties.

BACKGROUND OF THE INVENTION

Field of the Invention

The invention relates to a meter containing a meter housing having a measurement path through which a fluid which is intended to be measured can flow and an evaluation and display device for establishing at least one fluid-related measurement value. The evaluation and display device is arranged outside on the meter housing. The meter further has a cover which is secured to the meter housing and which engages over the evaluation and display device.

Such meters are known, for example, in the form of water meters or the like. They comprise a meter housing having a measurement path through which the fluid to be measured, therefore, for example, water, flows. By means of an evaluation device, that is to say, a processing device or an electronic evaluation system, using one or more suitable sensors or the like, one or more fluid-related measurement values relating to the fluid flowing through the measurement path is/are established. These are displayed on a display device.

In order to protect the evaluation and display device, there is provided, for example, on the meter housing a pot-like portion in which the evaluation and display device is placed and to which a cover which is generally transparent is then secured and covers the evaluation and display device. In order to prevent a penetration of moisture, a sealing agent is used. Via this, the planar cover, generally a glass pane, is sealed with respect to the meter housing or the pot-like portion. A disadvantage in this instance is the complex configuration of the housing with the pot-like portion in which the evaluation and display device is inserted. The insertion thereof, since it is intended to be secured to the base of the pot-like portion, is also complex since it requires a precise positioning of the evaluation and display device in order to be able to fix it to the corresponding securing locations at the housing side. Also, in spite of seals, it is not always ensured that the pane-like cover is also actually fluid-tight which may be the case when, for example, the sealing element in the form of an O-ring is not correctly positioned or the like. This is particularly disadvantageous when the meter is assembled in a permanently wet environment or is arranged permanently under water.

For one which is used in a permanently wet environment or under water, it is known to cast the evaluation and display device in a casting compound, wherein the display device is naturally cast in such a manner that it can still be seen, that is to say, the display can still be read. The casting is, on the one hand, very complex. On the other hand, the evaluation and display device is not accessible in the event of maintenance and damage and therefore has to be completely replaced where necessary.

SUMMARY OF THE INVENTION

The problem addressed by the invention is to provide a meter which is constructed in a simpler manner and which is suitable for use in a permanently wet environment or under water.

In order to solve this problem, with a meter of the type mentioned in the introduction, there is provision according to the invention for the cover to be a cap of glass which engages over the evaluation and display device and which rests in a state sealed via a sealing agent on the meter housing.

In the meter according to the invention, in contrast to in the prior art, there is provided no pot-like receiving portion in which the evaluation and display device is intended to be inserted. Instead, the evaluation and display device is engaged over by a cap of glass, which rests on the meter housing in a state sealed by a sealing agent. The cap, since it is of glass, is of a material which is diffusion-tight for water molecules. The meter housing, which generally contains metal, preferably brass, is also diffusion-tight. There is consequently still only a corresponding choice to be made with regard to the sealing agent that a diffusion tightness is also provided in this instance.

Consequently, on the one hand, the evaluation and display device can be mounted in a manner completely protected from moisture so that the meter can also be installed without any risk of penetration of moisture into the region of the evaluation and display device in a permanently wet environment or also under water. Furthermore, the construction of the meter housing is naturally also significantly simpler since a pot-like receiving region can be dispensed with since the glass cap as described completely engages over the evaluation and display device. Naturally, the assembly with respect to previously known meters is also significantly simpler since the evaluation and display device is not intended to be mounted in a sufficiently deep pot-like housing portion, but instead in the context of assembly can be placed on and fixed to the receiving portion or assembly portion of the housing which is readily accessible from above and from the side. Subsequently, only the cap of glass along with sealing agent is intended to be positioned.

The cap preferably has a cylindrical wall and a planar base. A bowl-shaped or pot-shaped cap form is thus produced. Alternatively, the cap may also have a different shape. It may have a polygonal wall, it may, for example, be rectangular or square, just as a hexagonal or octagonal wall shape is also conceivable. The base may also as an alternative to the planar construction be stepped or have a contour, for example, be curved. Since the cap has a three-dimensional geometry, it may also be referred to as a shaped glass cap.

In order to construct the meter housing in the simplest manner possible, it preferably has a plate-like receiving portion, on which the evaluation and display device is arranged and on which the cap, in a state sealed via the sealing agent, rests. On the meter housing, in addition to the generally cylindrical measurement path only the quasi-planar plate-like receiving portion is consequently intended to be constructed, which is particularly simple in technical production terms, particularly when the housing is a cast component. Such a plate-like portion also enables simple securing of the evaluation and display device which, for example, is fixed thereto by means of corresponding snap-fitting or locking connections. On precisely this receiving portion, the glass cap is also arranged via the sealing agent, that is to say, both for securing the evaluation and display device and the glass cap, a common securing plane or platform is provided.

Advantageously, a seat geometry for receiving the cap is provided on the meter housing or the plate-like receiving portion, while on the cap a shape-compatible geometry which engages in the seat geometry is constructed, wherein the sealing agent is provided between the seat geometry and the shape-compatible geometry. Although it would in principle be conceivable to construct the mutually adjacent portions of the glass cap and cylindrical housing or receiving portion with a planar surface, that is to say, in a planar manner, it is preferable for corresponding shape-compatible sealing geometries to be formed at both sides. There is formed on the housing or the receiving portion a first seat geometry, which thus also defines the arrangement positions of the cap, whilst the peripheral edge of the cap has a shape-compatible geometry or sealing geometry. That is to say, the two geometries engage in the assembly position virtually in each other so that the cap is centered and can be precisely positioned. The sealing agent is introduced between them so that, in addition to the sealing action of the sealing agent itself, an additional sealing action is also produced via the mutually engaging geometries.

Preferably, the respective geometries are constructed in the form of corresponding folds which are formed in accordance with the geometry of the cap or the wall, that is to say, they are annular or polygonal. If, for example, a disk or plate-like slightly protruding or raised receiving portion is provided, it is possible for there to be formed thereon at the edge slightly inwardly offset, for example, in the case of a cylindrical wall shape, an annular peripheral web so that overall an outwardly open fold is formed. The end edge which is also annular in this example is constructed with a complementary shape, preferably in such a manner that it externally engages with a radially outward annularly extending peripheral web around the web formed on the receiving portion. The sealing agent is arranged therebetween and has a geometry which follows these geometries which engage one in the other or fills this region completely. In the case of a polygonal wall shape, the geometry of the web and the end face are accordingly polygonal in order to enable suitable engagement.

Alternatively, there may also be provided on the receiving portion, for example, an annular or polygonal groove in which the cap engages with an edge-side protruding correspondingly shaped portion or in which the cap engages with the complete cap edge. The sealing agent is arranged in the groove.

The sealing agent itself may be an adhesive, that is to say, an inherently fluid medium which hardens after application and which forms a tight, preferably already inherently diffusion-tight sealing plane. In place of an adhesive, a casting compound may also be used. Alternatively, the sealing agent may also be a sealing element which, particularly when geometries which engage one in the other are formed by the housing and the cap, is also constructed in a shape-compatible manner, consequently thus already has a three-dimensional basic shape.

The cap itself may, for example, be secured to the meter housing by means of one or more securing elements. Corresponding securing screws or the like are conceivable. Alternatively, the securing may also be carried out via the sealing agent when an adhesive or a casting compound is used as the sealing agent.

Furthermore, an additional covering cap which engages over the cap and which is secured to the meter housing by one or more securing elements may be provided. This covering cap which is, for example of plastics material, may be placed as an additional protective cap over the glass cap. It can also rest tightly on the meter housing, preferably for this purpose a sealing agent, for example, an adhesive or a prefabricated sealing element, can also be used. A tight fit is, however, in this instance not absolutely necessary since the covering cap only acts as protection and, for example, the base of the covering cap may also be partially open so that the base of the glass cap is also exposed and it is possible to view it directly. If this covering cap, which preferably is also at least in the portion engaging over the base region of the glass cap, is transparent or may also be partially open at that location, is used, it is not absolutely necessary for the glass cap to also be secured to the meter housing with separate securing elements. Instead, it may already be sufficient in this case to fix the glass cap at the housing side using the sealing agent, in this instance preferably then an adhesive. This is because the mechanical protection is provided by the covering cap which is fixed via the securing elements in a sufficiently secure manner to the meter housing, where applicable the plate-like receiving portion.

The shape of the covering cap substantially corresponds to the shape of the glass cap so that they can be readily fitted one in the other. It is particularly preferable in this instance for the covering cap to engage over the cap at least partially in a form-locking manner so that the covering cap can abut the glass cap. An extensive or complete abutment is, however, not compulsory. In the case of an abutment, the glass cap is also thereby additionally fixed in its position.

In this instance, according to a particularly advantageous development of the invention, there is provision for the covering cap to abut at least partially against the cap and to clamp it against the meter housing. The covering cap consequently presses with the base face thereof against the base face of the glass cap so that this is axially pressed against the meter housing or the plate-like portion and consequently against the sealing agent. No securing elements at all for fixing the glass cap are necessary in this instance. The covering cap is, for example, via the securing elements, that is to say, the connection screws or the like, screwed in a sufficiently secure manner against the meter housing, whereby the cap of shaped glass is also clamped in a sufficiently secure manner against the meter-housing-side seat and consequently against the sealing agent. As an alternative to fixing the covering cap using securing elements, it is also conceivable for the fixing to be carried out by means of a sealing agent such as an adhesive or a casting compound, so that a force-locking connection of the different components is ensured using the sealing agent and no additional securing elements are required and have to be assembled.

Finally, there may be provided below the cap a moisture-adsorbent or moisture-absorbent agent, which is used to bind any residual moisture which still reaches the space below the glass cap during production. As a result of the complete diffusion tightness of the encapsulation of the evaluation and display device, this residual moisture cannot escape but it can be collected by means of the moisture-adsorbent or moisture-absorbent agent.

The meter itself is preferably a water meter.

Other features which are considered as characteristic for the invention are set forth in the appended claims.

Although the invention is illustrated and described herein as embodied in a meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
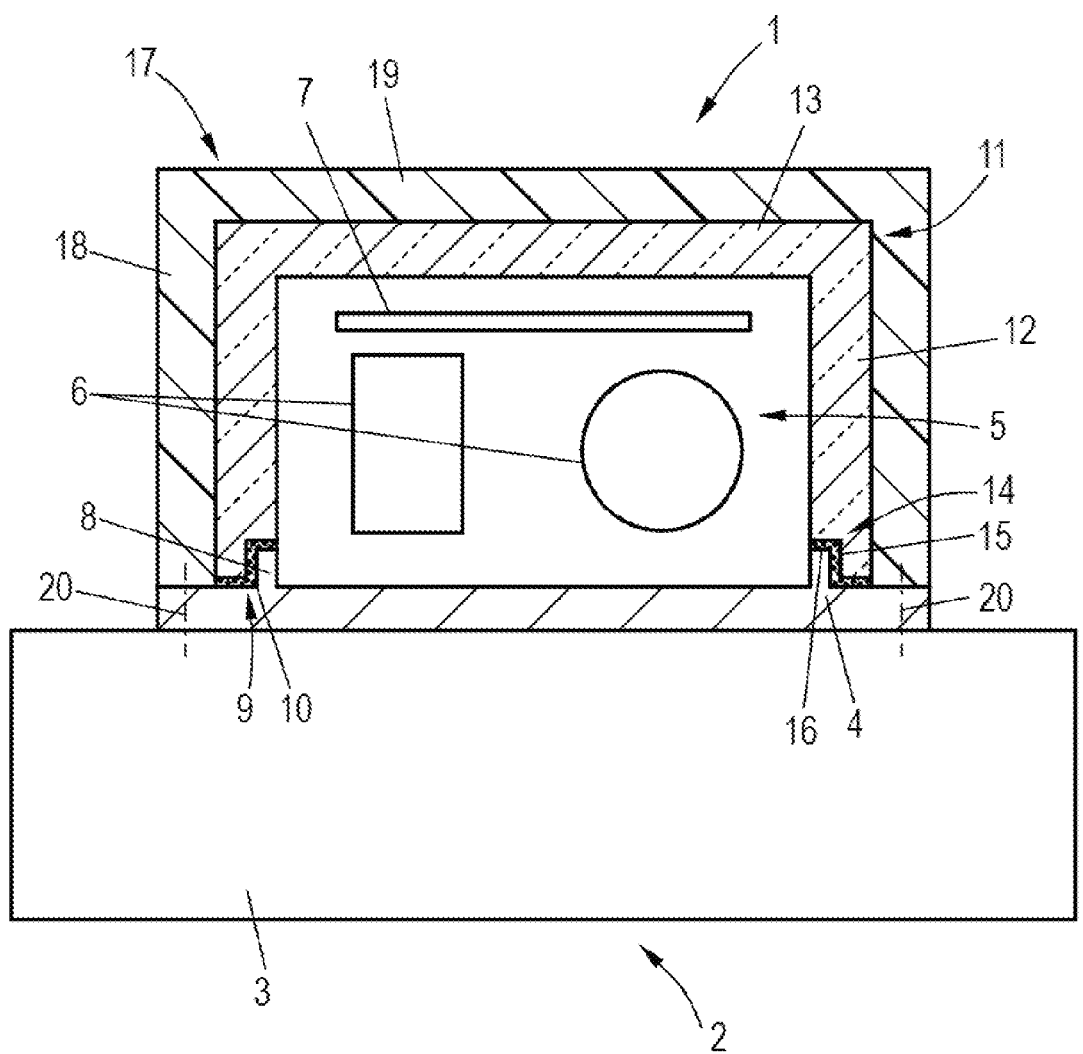
FIG. 1 is a schematic illustration of a meter according to the invention.
Figure 2:
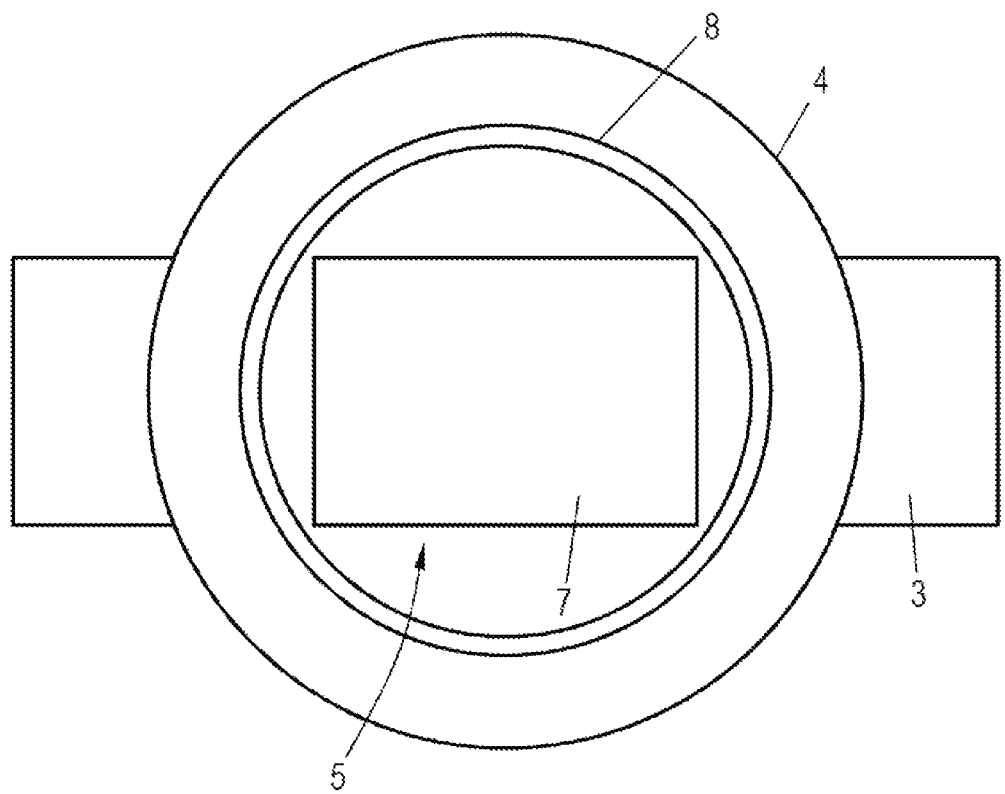
FIG. 2 is a plan view of the meter housing from FIG. 1 without a glass cap and covering cap being placed thereon.

Referring now to the figures of the drawings in detail and first, particularly to FIG. 1 thereof, there is shown a meter 1 according to the invention. The meter 1 has a meter housing 2 having a tubular measurement path 3 through which a fluid which is intended to be measured can flow and a plate-like receiving portion 4, on which an evaluation and display device 5 containing various electronic components 6 and a display screen 7 is arranged. The plate-like receiving portion 4, see FIG. 2, is round and protrudes laterally slightly over the measurement path 3. On the receiving portion 4, in a state slightly offset inward from the edge, an annular protruding web 8 is formed so that at the edge side on the plate-like receiving portion 4 a seat geometry 9 in the form of a fold 10 is formed. The meter housing 2 itself is, for example, made of metal, preferably brass.

There is further provided a cap 11 of glass, which in the example shown has a peripheral cylindrical wall 12 and a base 13 which terminates at the upper side. The cap 11 is of glass, that is to say, of a material which is diffusion-tight for water molecules.

At the end edge of the cylindrical portion 12, a shape-compatible geometry 14 is also constructed in the form of a fold 15. In the assembly position, see FIG. 1, the seat geometry 9 and the shape-compatible geometry 14 engage in each other. Between them a sealing agent 16 is provided, for example, a hardened adhesive or an annular sealing element which is inherently shaped to correspond to the cross-sectional shape of the sealing gap. This sealing plane is constructed in such a manner or the sealing agent is selected in such a manner that in this instance a diffusion-tight closure is also produced and water molecules cannot diffuse via this into the inner side of the cap 11.

There is further provided a covering cap 17, preferably of plastics material, which is constructed in a shape-compatible manner with respect to the cap 11 of glass. It also has a cylindrical wall 18 and a base 19, wherein at least the base is transparent so that the display 7 can be seen through both the base 19 and the base 13. Alternatively, the base 19 may also have a recess, that is to say, be open, so that it is possible to view directly the transparent base 13 of the glass cap 11. The covering cap 17 also rests on the plate-like receiving portion 4, as shown in FIG. 1. It is, in the same manner as the plate-like portion 4, constructed in a planar manner at the edge side. For securing, there are provided corresponding securing elements 20 which are indicated in this instance only by the dashed lines. For example, corresponding securing screws are used. In this instance, a sealing agent may also be interposed, although not shown in greater detail here.

The sizing of the shape-compatible covering cap 17 is selected in such a manner that, when it is secured to the meter housing 2, it rests at least with the base 19 on the base 13 and thereby clamps the glass cap 11 in the direction of the plate-like receiving portion 4. That is to say, the cap 11 is pressed or clamped via the screwed covering cap 17 against the sealing agent 16. The sealing seat thereby becomes even more secure and a separate securing of the glass cap 11 to the receiving portion 4 is also not required. Alternatively, the sealing agent 16, if this is an adhesive or a casting compound, may also serve to fix the cap so that no securing elements which have to be mounted separately are required.

It can be seen that the construction of the meter housing on which only the virtually planar, plate-like receiving portion 4 is intended to be constructed with the annular web 8 is extremely simple. In addition, the assembly of the evaluation and display device 5 is extremely simple since the securing face of the receiving portion 4 is readily accessible and the corresponding securing connections, for example, snap-fitting or locking connections, can be readily fitted or snap-fitted. Furthermore, as a result of the fitting of the glass cap 11, a diffusion-tight sealing of the cap interior and consequently a diffusion-tight protection of the evaluation and display device 5 is achieved. The additional fitting of the superimposed covering cap 17 further represents mechanical protection of the glass cap 11, as the cap 11 is also securely clamped in the sealing seat via the secured covering cap 17.

In place of the mutually engaging fold-like sealing geometries shown here on the receiving portion 4 and the edge of the cap 11, it is also conceivable to form an annular groove on the receiving portion 4 or in the receiving plane thereof. There engages therein, for example, a web-like annular projection which is formed at the end side of the cap 11 and whose width is slightly narrower than the groove width so that, on the one hand, it can readily be inserted into the annular groove and, on the other hand, also a sealing agent, whether it be an initially fluid, then hardened adhesive, whether it be a three-dimensionally prefabricated sealing element in which the annular groove can be introduced. The cap 11 rests with the cap edge on the receiving portion 4, wherein in this region the sealing agent may also still be provided. Alternatively, the annular groove may also be so wide that the cap 11 can be inserted therein with the entire edge, wherein in this instance the sealing agent of whatever type is also naturally introduced into the annular groove. It is also thereby possible for a diffusion-tight sealing plane to be produced, in this instance the mutually engaging geometries also additionally form a labyrinth seal.

Although not illustrated, it is possible inside the cap 11 to provide a moisture-adsorbent or moisture-absorbent agent in order to bind any residual moisture which may be present.

Figure 3:
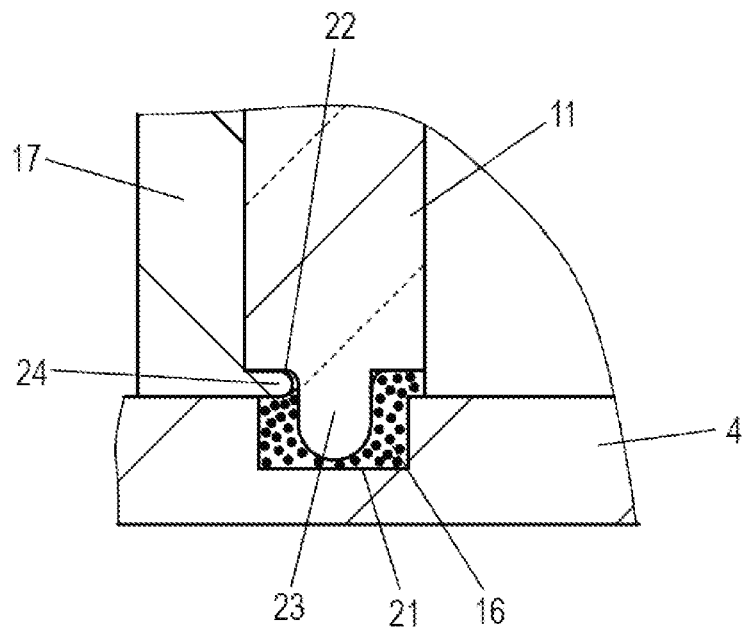
FIG. 3 is a partial view of another connection possibility of the cap and the covering cap with a receiving portion.

FIG. 3 shows another connection possibility for fixing the cap 11 and the covering cap 17 to the receiving portion 4. The receiving portion 4 has in this instance a groove 21 in which a sealing agent 16, for example, an adhesive or a casting compound, is introduced. There engages in the groove 21 a projection 23 which is provided on the cap 11 and which is formed on the end edge 22, whereby the cap 11 is fixed.

Furthermore, there is provided on the covering cap 17 in the region of the end edge a, for example, peripheral projection 24 which is directed inward toward the cap 11 and which is moved between the end edge 22 of the cap 11 and the receiving portion 4 so that there is produced a clamping of the projection 24 between the end edge 22 and the receiving portion. The sealing mass 16 which may be slightly displaced from the groove 21 when the projection 23 presses into the sealing mass 16 may at the same time also serve to seal the transition to the covering cap 17 or, for example, to adhesively bond the covering cap 17.

Alternatively, it is possible, for example, to provide a plurality of distributed projections 24 on the covering cap 17 and to configure these as locking projections so that the covering cap 17 is also subsequently placed on the cap 11 and pushed along it into the end position, where the projections 24 engage in a recess between the end edge 22 of the cap 11 and the receiving portion 4.

Although the figures show a round cap arrangement with cylindrical walls, a polygonal, for example, rectangular or square shaping is also conceivable, which naturally also leads to a corresponding adaptation of the geometry which is used for fixing, etcetera, in the region of the folds, grooves, projections, etcetera.

The meter shown is, for example, a water meter, but it may also be in this instance a different type of meter. In any case, it is possible to be able to mount the meter in a highly or permanently wet environment and also under water since the evaluation and display device 5 is protected from the penetration of water, even of the molecular type, regardless of the assembly location.

The invention claimed is:

1. A meter, comprising:
   a meter housing having a measurement path through which a fluid which is intended to be measured can flow;
   an evaluation and display device for establishing at least one fluid-related measurement value, wherein said evaluation and display device is disposed outside on said meter housing;
   a sealing agent; and
   a cover secured to said meter housing and engaging over said evaluation and display device, wherein said cover is a cap of glass engaging over said evaluation and display device and rests in a state sealed via said sealing agent on said meter housing, said meter housing having a plate-shaped receiving portion, on which said evaluation and display device is disposed and on which said cap, in the state sealed via said sealing agent, rests.

2. The meter according to claim 1, wherein said cap has a cylindrical or polygonal wall and a planar or stepped or contoured base.

3. The meter according to claim 1,
   further comprising a seat geometry for receiving said cap disposed on said meter housing or said plate-shaped receiving portion; and
   wherein said cover has a shape-compatible geometry which engages in said seat geometry, wherein said sealing agent is disposed between said seat geometry and said shape-compatible geometry.

4. The meter according to claim 3, wherein said seat geometry and said shape-compatible geometry is formed in a form of annular folds.

5. The meter according to claim 1, wherein:
   said cap has a projecting portion; and
   said plate-shaped receiving portion has a groove formed therein in which said cap engages with said projecting portion or with a complete cap edge.

6. The meter according to claim 1, wherein said sealing agent is an adhesive, a casting compound or a sealing element.

7. The meter according to claim 1, further comprising at least one securing element, said cap is secured to said meter housing by means of said at least one securing element.

8. The meter according to claim 1, further comprising:
   at least one securing element; and
   a covering cap which engages over said cap and is secured to said meter housing by means of said at least one securing element.

9. The meter according to claim 8, wherein said covering cap is sealed with respect to said meter housing by means of said sealing agent.

10. The meter according to claim 8, wherein said covering cap has a shape substantially corresponding to a shape of said cap.

11. The meter according to claim 8, wherein said covering cap engages over said cap in a form-locking manner.

12. The meter according to claim 8, wherein said covering cap abuts at least partially against said cap and clamps said cap against said meter housing.

13. The meter according to claim 8, wherein said covering cap is formed from a plastic material.

14. The meter according to claim 1, further comprising a moisture-adsorbent or moisture-absorbent agent disposed below said cap.

15. The meter according to claim 1, wherein the meter is a water meter.

16. The meter according to claim 1, further comprising a further sealing agent in a form of an adhesive or a casting compound, said cap is secured to said meter housing by means of said further sealing agent.

* * * * *